United States Patent [19]

Moatti

[11] 3,739,914

[45] June 19, 1973

[54] SELF-CLEANING FILTER ELEMENTS

[76] Inventor: Samuel Georges Moatti, 17 rue Gutemberg, 92 Boulogne, France

[22] Filed: July 22, 1971

[21] Appl. No.: 165,107

[30] Foreign Application Priority Data

Aug. 27, 1970 France ............................. 7031389

[52] U.S. Cl. ............................... 210/333, 210/346
[51] Int. Cl. ...................... B01d 29/38, B01d 25/32
[58] Field of Search ................. 210/333, 340, 346, 210/347, 345

[56] References Cited
UNITED STATES PATENTS

| | | | |
|---|---|---|---|
| 3,149,070 | 9/1964 | Nash | 210/333 X |
| 984,705 | 2/1911 | Rarick | 210/333 |
| 2,770,368 | 11/1956 | Tischer | 210/346 X |
| 3,019,904 | 2/1962 | Stecher | 210/346 X |

*Primary Examiner*—Frank A. Spear, Jr.
*Attorney*—Curtis, Morris & Safford

[57] ABSTRACT

A filtering element for a self-cleaning filter in the form of a disc having a chamber made in its thickness and limited by two filtering gauzes or the like disposed parallel to the plane of the disc, wherein separate chambers are arranged on the outside of the gauzes, one chamber on one side of a gauze communicating with the corresponding chamber on the side of the other gauze by two transverse conduits, whilst the chamber or chambers between the gauzes communicate with the outside of the disc by radial conduits.

7 Claims, 2 Drawing Figures

PATENTED JUN 19 1973  3,739,914

Inventor
SAMUEL GEORGES MOATTI

By Lewis H. Eslinger
Attorney

SELF-CLEANING FILTER ELEMENTS

The present invention relates to a self-cleaning filter element.

Self-cleaning filters are generally constituted of independent filters mounted in parallel with an assembly of controls enabling one of the filters to be alternately fed in countercurrent in order to effect cleaning thereof. Each filter is generally composed of an assembly of filtering elements mounted in parallel, this necessitating considerable modifications of the self-cleaning filter, according to the capacity of filtering desired.

The aim of the invention is to produce a self-cleaning filtering element enabling, by assembling these elements, self-cleaning filters of different capacity to be obtained.

The invention therefore has for its object a self-cleaning filtering element in the form of a disc having a chamber made in its thickness and limited by two filtering gauzes or the like disposed parallel to the plane of the disc, characterised in that chambers are made on the outside of the gauze, one chamber on one side of a gauze communicating with a chamber on the side of the other gauze by two transverse conduits whilst the single chamber between the gauzes communicates with the outside of the disc by radial conduits.

The invention will be described in greater detail with reference to the accompanying drawings, in which.

Figure 1:
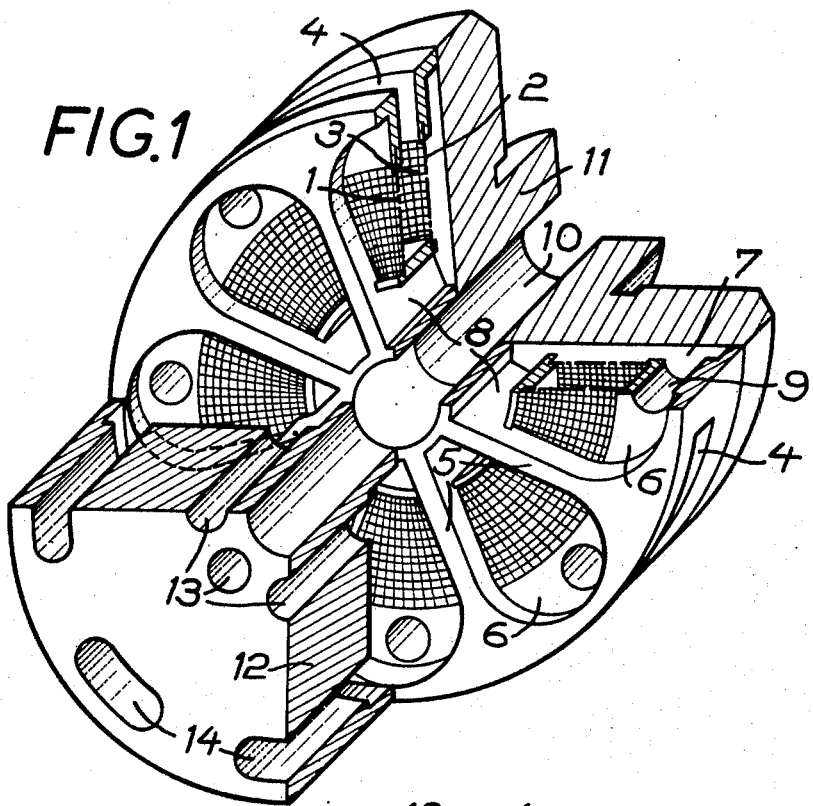
FIG. 1 is a perspective view with partial section of a filtering elements according to the invention.

The filtering element according to the invention, shown in FIG. 1, is in the form of a disc comprising two filtering gauzes 1 and 2 disposed annularly in two parallel planes and defining an annular chamber 3 communicating with the outside through openings 4 made in the thickness of the disc.

Outside the gauzes 1 and 2 are disposed radial ribs 5 which define chambers 6 and 7 on each side.

Each chamber 6 communicates with the opposite chamber 7 by two transverse conduits 8 and 9. The element comprises in addition a central aperture 10 serving for example for the passage of a stay for assembly and mounting of the filter.

The filter is made from one or more stacked elements, provided on one side with a side plate 11 forming a closing cover and on the other side with a collector side plate 12 provided with openings 13 and 14 corresponding to conduits 8 and 9.

Figure 2:
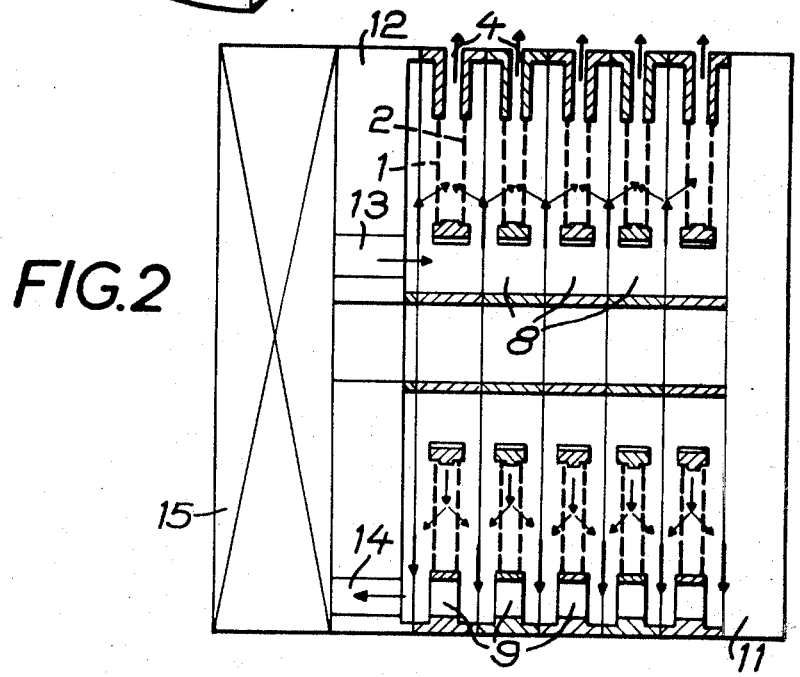
FIG. 2 is a sectional view of a filter made by assembly of filtering elements similar to that of FIG. 1, the section being made along the same line as in FIG. 1.

The functioning of the filter is illustrated in FIG. 2 where a filter formed of five assembled elements is shown.

There is disposed in front of the collector a regulator and distributor device 15 which comprises for example a rotary obturator closing a feed conduit 13 and opening the corresponding conduit 14 successively.

Thus, the liquid to be filtered penetrates into conduits 13 and spreads through conduits 8 into chambers 6 and 7 then through the filtering gauzes 1 and 2, passes into chambers 3 to flow to the outside through openings 4.

At the same time, the series of chambers 6 and 7, whose feed conduit 13 is closed, is subjected to a cleaning counter-current. In fact, the pressure of the cleaned liquid in the chambers 3 forces the cleaned liquid back through the gauzes 1 and 2 into the non-fed chambers 6 and 7 disengaging the impurities from the gauzes and taking them through conduits 9 and 14 to the tank of liquid to be filtered or, in a variant embodiment, to a tank known as an impurity chamber.

Without departing from the scope of the invention, the element does not have to comprise transverse conduits 8, the chambers 6 and 7 then being fed through a radial aperture opening out into the central aperture which in this case serves as feed collector. For the counter-current cleaning operation, the radial apertures are closed by a rotary obturator mounted in the central apertures 10.

What is claimed is:

1. A self-cleaning filter including a filter element comprising a disk having a peripheral wall and a first chamber formed therein, said peripheral wall having at least one aperture formed therein providing communication between said first chamber and the outside of said disk, a pair of spaced filtering gauzes mounted in said disk to define two parallel sides of said first chamber, means defining a plurality of pairs of independent fluid chambers on opposite sides of said first chamber, each of said pairs of independent fluid chambers being in communication with said first chamber through said gauzes, and a plurality of independent pairs of radially spaced inlet and outlet conduits respectively associated and in communication with said respective pairs of fluid chambers, with each of said independent pairs of inlet and outlet conduits providing communication only between their associated independent pair of fluid chambers.

2. The self-cleaning filter as defined in claim 1 including a central fluid conduit extending axially through said disk wherein the inlet conduit of each of said pair of conduits comprises a separate radial aperture in said central conduit associated with each of said fluid chambers to provide fluid communication between said central conduit and said fluid chambers.

3. A self-cleaning filter as defined in claim 1 including a plurality of said filter elements mounted in an axially aligned stack, with the fluid chambers thereof positioned in complementary relation, a cover plate closing one end of said stack, and a collector side plate mounted on the other end of said stack, said side plate having a plurality of apertures formed therein corresponding substantially to said inlet and outlet conduits and mounted in complementary relation thereto, and a rotary obturator means in said side plate for selectively opening one of said outlet conduits in said plurality of independent radially spaced outlet conduits and simultaneously closing its associated inlet conduit for selectively backwashing the portions of the filtering gauzes associated with each of said pairs of fluid chambers.

4. A self-cleaning filter as defined in claim 1 including means for selectively closing one of the inlet conduits in said plurality of independent radially spaced inlet conduits while simultaneously opening its associated outlet conduit for backwashing of the portions of the filtering gauzes associated with the pair of independent fluid chambers to which said opened and closed outlet and inlet conduits are associated.

5. A self-cleaning filter as defined in claim 4 wherein said first chamber is generally annular and said filtering gauzes are spaced, radially extending annular members.

6. A self-cleaning filter as defined in claim 5 wherein said means comprises a plurality of radially extending ribs in said disk located on opposite sides of said annular chamber, each of said ribs on one side of said annular chamber being in axial alignment with a corresponding rib on the other side of said annular chamber whereby complementary fluid chambers are defined on opposite sides of said disk.

7. A self-cleaning filter as defined in claim 4 wherein said means simultaneously closes the remainder of said outlet conduits and opens the remainder of said inlet conduits.

* * * * *